Sept. 22, 1970　　　　　　　F. HYATT　　　　　　　3,529,332
TENTER FRAME
Filed June 14, 1968　　　　　　　　　　　　　　　　4 Sheets-Sheet 1
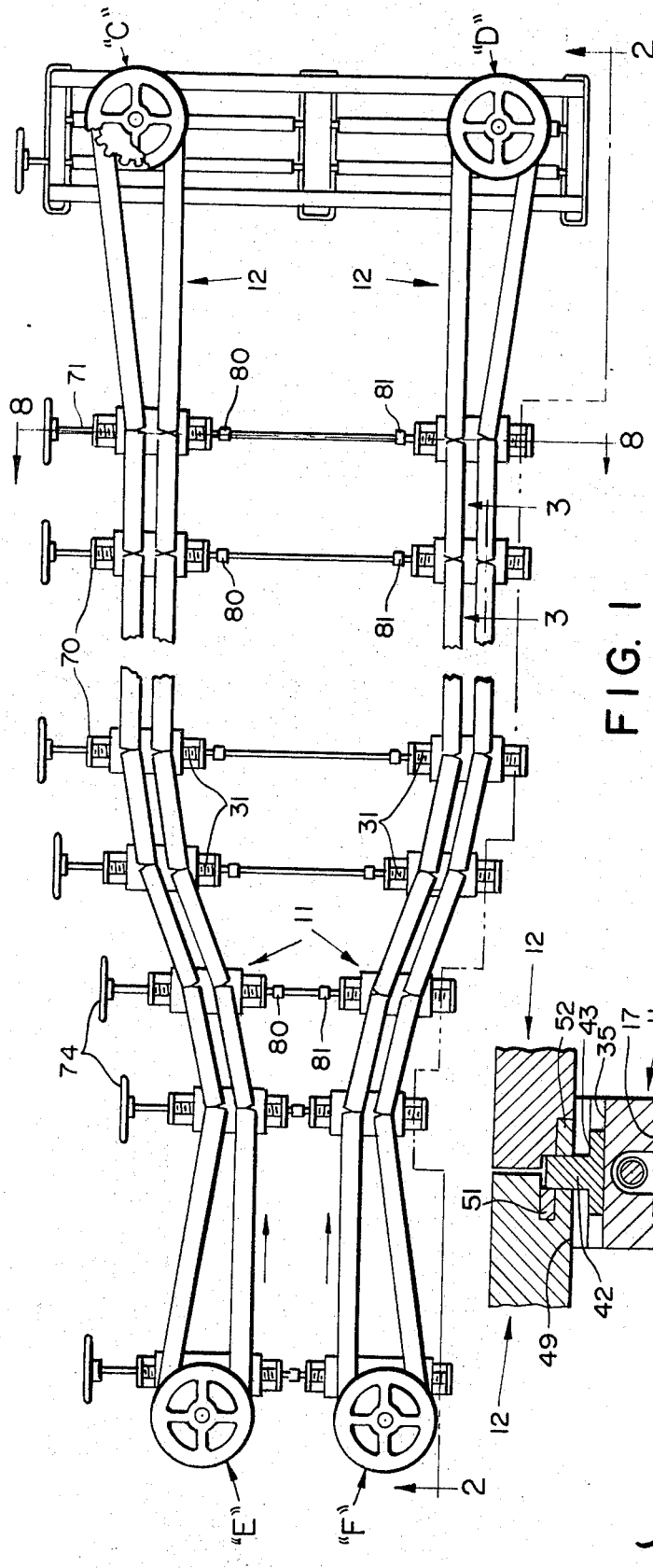
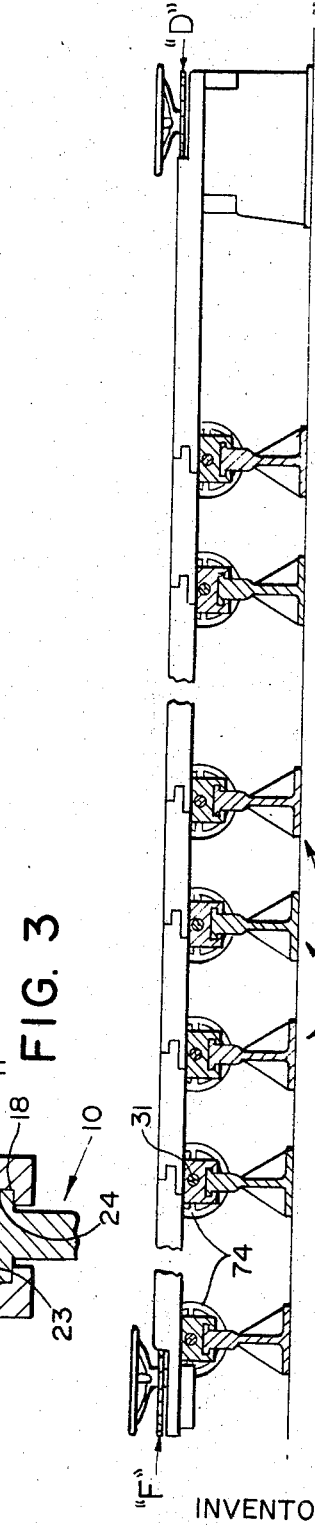
INVENTOR
FREDERICK HYATT
BY
　William Frederick Werner
　　　　　ATTORNEY

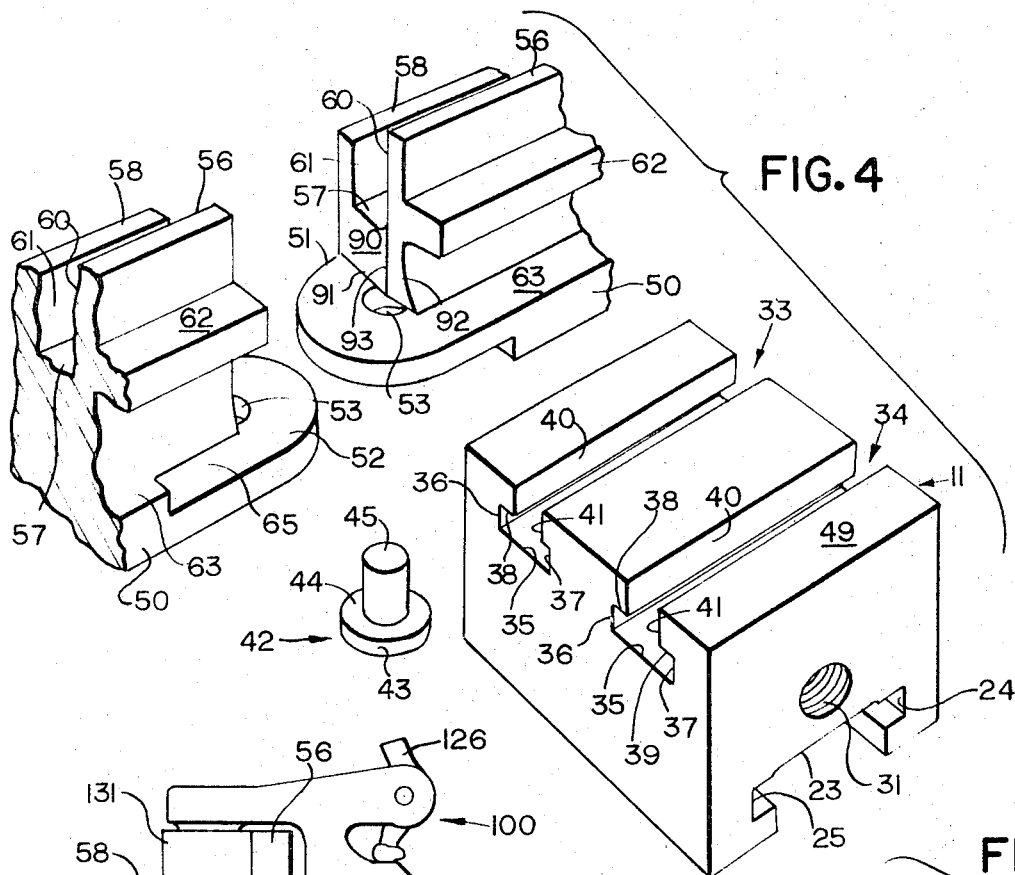

Sept. 22, 1970          F. HYATT          3,529,332
TENTER FRAME
Filed June 14, 1968          4 Sheets-Sheet 3
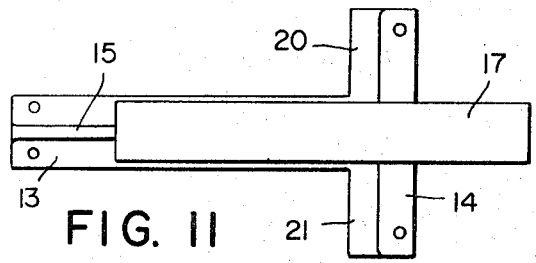
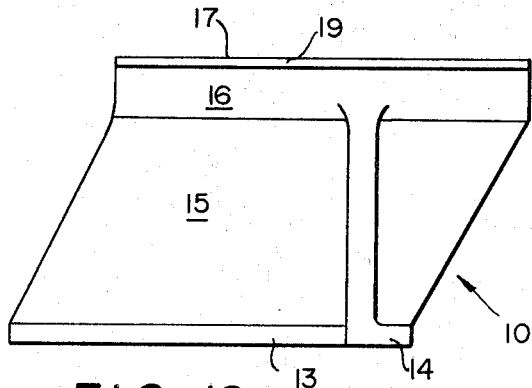
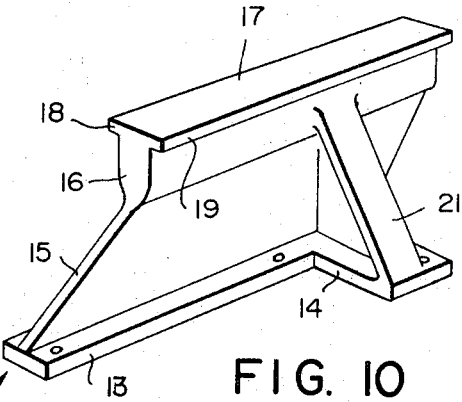
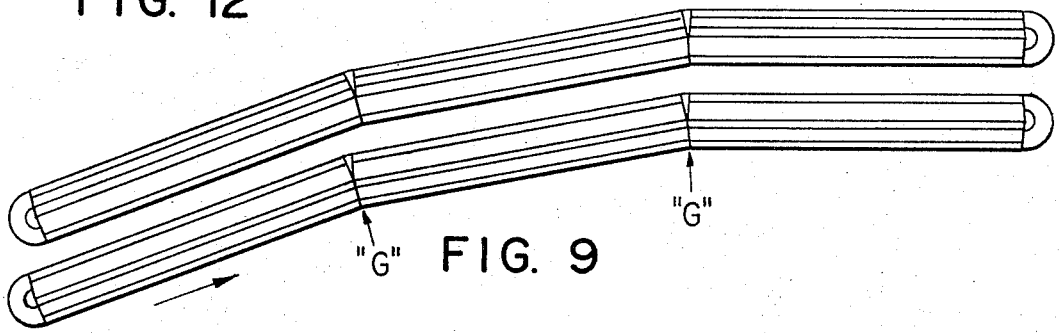
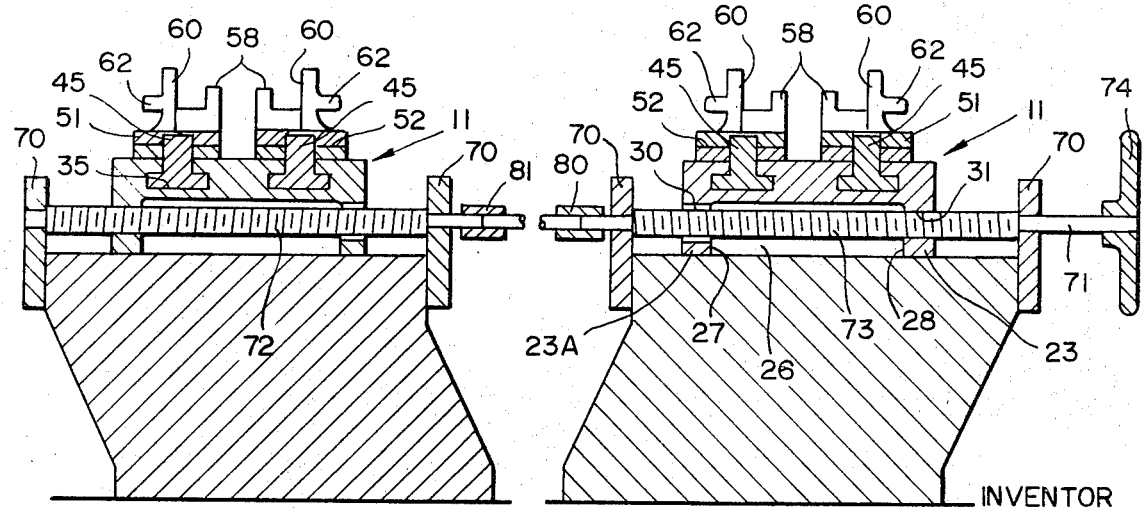
INVENTOR
FREDERICK HYATT
BY William Frederick Werner
ATTORNEY Sept. 22, 1970   F. HYATT   3,529,332
TENTER FRAME
Filed June 14, 1968   4 Sheets-Sheet 4
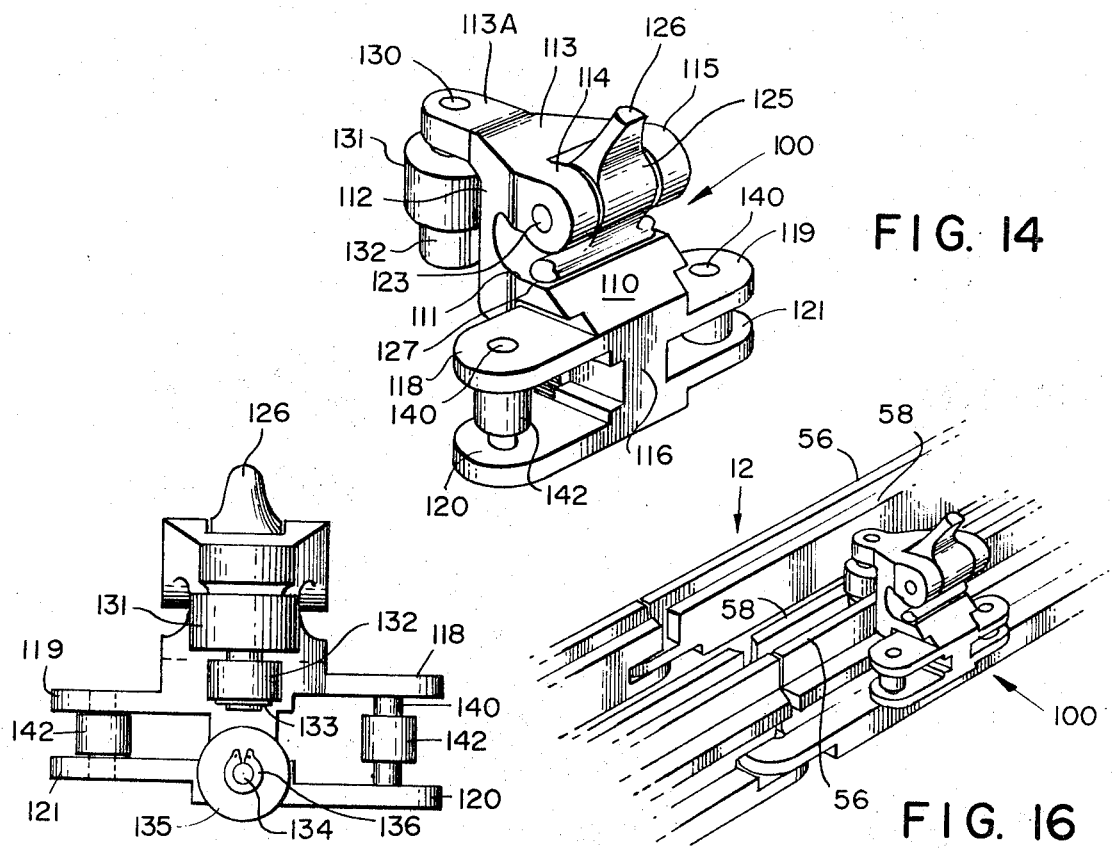
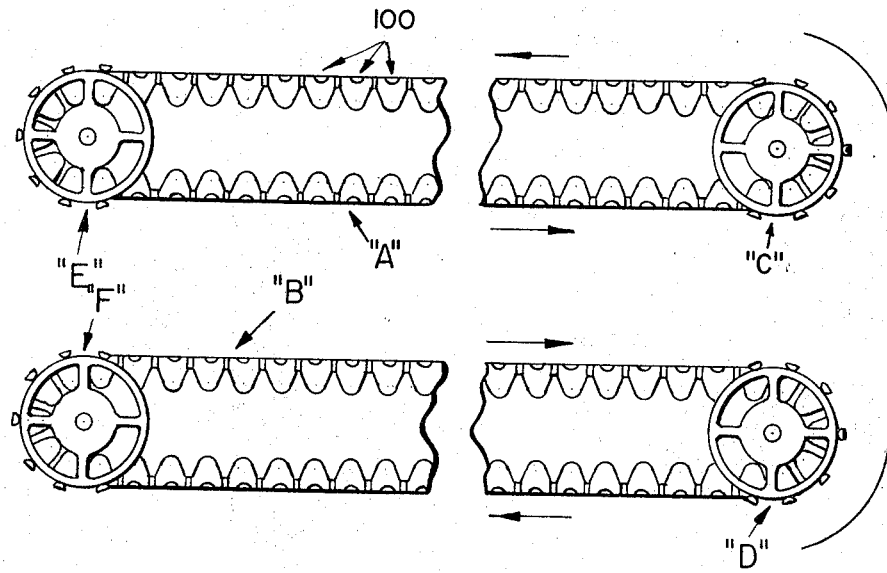
INVENTOR
FREDERICK HYATT.
BY
William Frederick Werner
ATTORNEY

United States Patent Office 3,529,332
Patented Sept. 22, 1970

3,529,332
TENTER FRAME
Frederick Hyatt, Providence, R.I., assignor to Bevis Industries, Inc., Providence, R.I., a corporation of Florida
Filed June 14, 1968, Ser. No. 737,148
Int. Cl. D06c 3/02
U.S. Cl. 26—61                    2 Claims

ABSTRACT OF THE DISCLOSURE

This invention relates to tenter frames and more particularly to a tenter frame provided with a plurality of roller engaging surfaces on the rail, whereby the tenter clip travels in a balanced condition while carrying a very high tensile load, or in a return cycle with no load; and with a minimum gap between adjacent rail sections.

---

This invention relates to apparatus for stretching webs of film and more particularly it relates to a tenter frame for laterally stretching thermoplastic film to increase its width and the reduce the web thickness.

An object of the present invention is to provide apparatus for stretching webs, of high tensile strength thermoplastic film, laterally within a smooth, reverse curve track while gripping the film along opposite edges by means of tenter clips.

Another object of the present invention is to provide adjustable apparatus in the nature of a tenter frame for varying the path of travel of tenter clips.

A further object of the present invention is to provide a plurality of roller engaging surfaces on a rail, whereby the tenter clip travels in a balanced condition while carrying a very high tensile load, or in a return cycle with no load.

And still another object of the present invention is to provide a stand supporting a saddle, rail sections and tenter clips with an opposing tipping moment to the longitudinal and lateral forces exterted upon the rail sections, saddle and stand by the web pulling the tenter clips.

In the past, a tenter clip frame was used to grip cloth on opposite edges and move the cloth in a horizontal plane through an oven, or an enclosure for moistening or drying the continuous web of material.

Within recent years there has developed a need to handle continuous sheets or webs of plastic film in order to stretch the film sidewise or laterally to increase the lateral area of the film while uniformly reducing the thickness of the film. Thermoplastic film presents a stretching problem because of inherently high tensile strength and because the film must be maintained in a plastic or heat softened state during the stretching operation. The problem of stretching the thermoplastic film is magnified due to the high coefficient of friction while in the plastic or heat softened state. Another problem presented in stretching thermoplastic film is to avoid localized stretching which produces thin spots in the film. Uneven stretching is imparted by shock or bumps of tenter clips in the travel of the tenter clips and film through the tenter frame.

Accordingly, it is an object of the present invention to provide an improved tenter frame with a minimum gap between adjacent rail sections and with a reduction in the horse power requirement to pull the web through the tenter frame by reducing the frictional load normally found in prior art tenter frame structures.

Other objects of the present invention will be pointed out in part and become apparent in part in the following specification and claims.

In the specification and claims the term "web" includes any type of web material such as cotton, wool, synthetic fibers, plastic film, aluminum foil, glossy paper, etc.

Referring to the drawings in which similar characters of reference indicate corresponding parts in all the figures:

FIG. 1 is a schematic plan view of a tenter frame, showing the rails. The tenter clip chain is left out.

FIG. 2 is a side elevational view, partly in section, taken along line 2—2 of FIG. 1.

FIG. 3 is a fragmentary cross sectional view, taken on line 3—3 of FIG. 1.

FIG. 4 is a fragmentary perspective view, partly in section, showing adjacent rail sections, a pivot pin and saddle.

FIG. 5 is a perspective view of opposite and parallel rail sections.

FIG. 6 is an end view of a rail section, with a new and improved tentering clip in operative position within the rail tracks.

FIG. 7 is a view, similar to FIG. 6, looking from the opposite end of the rail, with a conventional tenter clip in operative position within the rail.

FIG. 8 is a transverse cross sectional view, taken along line 8—8 of FIG. 1.

FIG. 9 is a diagrammatic plan view of adjacent rail sections.

FIG. 10 is a perspective view of the new and improved stand.

FIG. 11 is a plan view of FIG. 10.

FIG. 12 is a right side elevational view of FIG. 10.

FIG. 13 is a left end view of FIG. 10.

FIG. 14 is a perspective view of the tenter clip shown in side elevation in FIG. 6.

FIG. 15 is a rear elevational view of FIG. 14.

FIG. 16 is a fragmentary perspective view, showing the tenter clip of FIG. 14, in operative position on the rails.

FIG. 17 is a schematic view of a tenter frame showing the tenter clip chain which travels in the rails shown in FIG. 1.

In proceeding with this invention, reference is made to the drawings, wherein is illustrated the new and improved tenter frame, which consists of a stand, saddle and rails generally indicated, respectively, by reference numerals 10 in FIG. 10, 11 in FIG. 4, and 12 in FIG. 5.

Stand 10 consists of an elongated base member 13 having an intersecting arm 14. A longitudinal rib 15 projects upwardly from base member 13 and is provided with a head having a bearing surface 17 of sufficient width to provide gib edges 18 and 19. Angular transverse ribs 20, 21 connect intersecting arm 14 with head 16.

The stand 10 provides a unitary structure to be used in a plurality of units in a horizontal line, and in a plurality of units in a second longitudinal line, oppositely disposed unit for unit with the first longitudinal line.

The unitary structure stand 10 upon which a saddle 11 is slidably mounted must withstand the transverse forces imposed by the web held by oppositely disposed tenter clips riding the rail tracks and also withstand the longitudinal forces imposed by the travel of the tenter clip chains carrying the web through the length of the tenter frame with the rails generally in non-aligned or curved position (see FIGS. 1 and 9). Stand 10 is provided with a negative tipping moment imposed by these forces.

Saddle 11 consists of a block member having a chamber 26 (see FIGS. 4 and 8) with oppositely located walls 27, 28. Walls 27, 28 have sliding surfaces 23, 23A, respectively, terminating in oppositely disposed U-shaped grooves having gib edge engaging surfaces 24 and 25.

Wall 27 has a clearance orifice 30. Wall 28 is provided with a screw thread 31.

Two T-shaped grooves, generally indicated by reference numerals 33, 34 are provided in saddle 11. Each T-shaped groove consists of a base 35, oppositely located walls 36, 37, upper surfaces 38, 39 and parallel guide surfaces 40, 41.

A pivot pin, generally indicated by reference numeral 42 consists of an enlarged head 43 having a shoulder 44 and a shank 45.

Reference is made to FIGS. 1, 2, 3, 4, 5, 6, 7, 8 and 9 wherein is shown the new and improved rails 12. As is known in the art the rails comprise sections, as shown in FIGS. 1, 2, 3, 4 and 5. Each rail section 12 consists of a base 50 having a cut away area on one end to provide a hinge plate 51 and a cut away area on the opposite end to provide a bottom platform 52. Hinge plate 51 and bottom platform 52 are each provided with a pin bore 53. A body portion 55 projects upwardly from base 50 to provide a U-shaped track consisting of a front flange 56, a bottom 57 and a foreshortened rear flange 58. Front flange 56 is provided with a front rail face 60. Foreshortened rear flange 58 is provided with anti-tipping roller surface 61. A rib 62 projects sidewise from front flange 56. A roller surface 63 is provided on base 50. Base 50 is also provided with a slot 65 to provide for the pivotal movement of hinge plate 51.

The assembling and operation of the present tenter frame will now be described. A plurality of stands 10 will be aligned longitudinally and laterally (FIGS. 1, 2, 3 and 8). A saddle 11 will be slidably mounted upon each stand 10 with sliding surfaces 23 and 23A, slidingly supported upon bearing surface 17 and with gib engaging surfaces 24, 25 slidingly engaging gib edges 18, 19, respectively (see FIG. 3). Pivot pins 42 will be slidingly mounted in T-shaped grooves 33, 34 with enlarged head 43 slidingly engaging base 35 and shank 45 projecting above guide surfaces 40, 41. A rail section 12 will lie upon top surface 49 of saddle 11 with shank 45 projecting through pin bore 53 of bottom platform 52. Another rail section 12 will be pivotally mounted to shank 45 through pin bore 53 with hinge plate 51 lying upon bottom platform 52. Shank 45 will not project all the way through pin bore 53 in hinge plate 51. Rail section 12 of hinge plate 51 will also be slidably supported upon top surface 49.

As shown in FIGS. 1 and 8, end plates 70 are fastened to stands 10 and a shaft 71, provided with left hand threads 72 and right hand threads 73, is rotatively mounted in end plates 70 provided with bearings for that purpose. A hand wheel 74 is fastened to the end of shaft 71. As previously stated, each saddle 11 is provided with screw threads 31. The screw threads in one saddle are of the right hand type so as to be rotatively engageable with the right hand threads 73 on shaft 71. The laterally or oppositely located saddle is provided with left hand threads 31 so as to be rotatively engageable with the left hand threads 72 and shaft 71. Rotation of hand wheel 74 will cause the respective saddles 11 to slide upon stands 10, whereby, guide rail sections 12 pivotally connected to the saddle 11 will pivot relative to each other. In this manner as shown in FIG. 1, the rail sections 12 can be moved to form a longitudinally curved track wherein, tenter clips, generally indicated by reference numeral 100 may travel.

As shown in FIGS. 1 and 8, shaft 71 may be manufactured in sections and connected together by means of bushings 80, 81. This is a manufacturing expediency.

The tenter clip 100 shown in FIGS. 6 and 14 is the subject of a patent application, Ser. No. 721,752, filed May 16, 1968 and consists of a horizontally disposed base 110, provided with a horizontal clamp surface 111, a vertical upstanding wall 112, a horizontal platform 113 which overhangs the vertical upstanding wall 112 to form a rearward portion 113A and a forward portion overlying said horizontal clamp surface 111 and terminating in a pair of spaced apart arms 114 and 115. Base 110 is provided with a depending central section 116.

Central section 116 is provided with a first upper ear 118 and a second upper ear 119 which projects horizontally sidewise in opposite directions. The top surface of second ear 19 lies in a horizontal plane below the bottom of first ear 118. Central section 116 is also provided with a first lower ear 120 and a second lower ear 121 which project horizontally sidewise in opposite directions parallel, respectively, to said first upper ear 118 and second upper ear 119. The bottom surface of second lower ear 121 lies in a horizontal plane above the top surface of first lower ear 120. In this manner, as seen in FIGS. 14 and 15, first upper ear 118 overlies second upper ear 119 and second lower ear 121 overlies first lower ear 120 of adjacent tenter clips 100 to provide the leafs of a hinge when pivoted about axle pin 140.

Pivotally mounted between spaced apart arms 114, 115 on a pintle 123 supported in arms 114, 115 is a jaw 125 provided with a projection 126 and a clamping edge 127. Jaw 125 is loosely hinged to pintle 123, so as to be normally free to move automatically into vertical relation with horizontally disposed clamp surface 111, under the action of gravity, to provide a material clamping action between clamping edge 127 and clamp surface 111.

A stud 130 is fastened in rearward portion 113A, as by means of a drive fit. A front roller 131 is rotatably mounted upon a stud 130. A rear rail roller 132 is also rotatably mounted upon stud 130. A spring ring 133 fastened to stud 130 removably retains rollers 131 and 132 upon stud 130.

A shaft 134 is fastened in central section 116, as by means of a drive fit. A weight support roller 135 is rotatably mounted upon shaft 134 and held thereon, by means of a snap ring 136 mounted upon shaft 134. A sleeve roller 142 is rotatably mounted upon each axle pin 140.

The working face of front rail roller 131 rotatably engages and travels along front rail face 60, during the material gripping cycle of the tentering clip chain. The working face of rear rail roller 132 rotatably engages and travels along rear rail surface 61 during the return tenter clip cycle.

A tenter chain consists of a plurality of individual tentering clips pivoted together to form an endless chain which travels in a track provided by rail sections, and is driven by a sprocket wheel.

FIG. 1 shows the rails. FIG. 17 shows the tenter clip chain which travels within the track provided by the rails.

A tenter frame (FIGS. 1 and 17) consists of two tenter chains, generally indicated by reference characters A and B, two drive sprockets generally indicated at C and D, and two idler sprockets generally indicated at E and F, and two parallel rails 12 (see FIGS. 1, 4, 5 and 17) in spaced relation. The drive sprocket wheels C and D are oppositely located at one end of the rails. The cloth enters over the idler sprockets E and F of the tenter frame to be gripped upon opposite edges by the tentering clips which are pulled toward the drive sprocket wheels C and D. The tenter chains are taut in the length between idler sprocket wheels E and F and the drive sprocket wheels C and D. During this drive cycle the working face of front rail rollers 131 bear against front rail face 60 (see FIG. 6). The web exerts a great force tending to pull the oppositely and generally parallel tentering clips toward each other. At the sprocket wheels C and D drive end of the frame, the jaws of the tenter clips are pivoted by cam means (not shown) against projection 126 to release the web. Upon release of the web, the tenter chain becomes limp and travels in a limp condition from the drive sprocket wheels C and D to the idler sprocket wheels E and F. During this cycle of the tenter chain the working face of rear rail rollers 132 engage rear rail surface 61 and thereby prevents the individual tenter clip from tipping away from the front rail surface 60.

One of the unique structural features of the present tenter frame is the location of pivot pin 45 in relation to front rail face 60, whereby the center of the vertical axis of pivot pin 42 is a continuation of vertical surface front rail face 60.

With reference to FIG. 4, the end face 90 of rail 12 is provided with two beveled surfaces 91, 92. The line 93 of demarcation between beveled surfaces 91, 92 passes through the vertical axis of pivot pin 42 and pin bore 53.

The combination of the location of pivot pin 42 to front rail face 60 provides a very small gap G (FIG. 9) between adjacent rail ends so that the continuation of front rail face 60 from one adjacent rail to the next rail is interrupted by a gap which does not interrupt the smooth passage of a tenter clip over the gap. The arrow, in FIG. 9, shows the direction of travel of the tenter clip chain when the tenter clip is gripping the edge of material. The amount of bevel upon opposite rail edges 91, 92 determines the relative movement around pivot pin 42, between rail sections 12.

FIG. 7 shows that the new rail 12 construction will accommodate the construction of the tenter clips 100A known to the prior art. The top case 100B is fastened to rear flange 58 by means of a bolt 100C.

FIG. 16 shows a tenter clip in position on a rail section.

Having shown and described a preferred embodiment of the present invention, by way of example, it should be realized that structural changes could be made and other examples given without departing from either the spirit or scope of the present invention.

What I claim is:

1. A tenter frame in which each rail section consists of a base having a cut away area on one end to provide a hinge plate and a cut away area on the opposite end to provide a bottom platform, pivot bores being located, respectively, in said hinge plate and in said bottom platform, a body portion having opposite ends, each opposite end having an end face projecting upwardly from said base, a U-shaped track consisting of a front flange, a bottom and a foreshortened rear flange, provided in said body portion, a front rail face provided in said front flange, an anti-tipping roller surface provided in said fore-shortened rear flange, a rib projecting sidewise from said front flange, a roller surface provided on said base beneath said rib and a slot provided in said body portion for pivotal movement of the hinge plate of an adjacent rail section.

2. A tenter frame as claimed in claim 1, in which an end face tapers in two directions from the plane of the front rail face passing through the axis of the pivot bore.

References Cited

UNITED STATES PATENTS

| 2,530,119 | 11/1950 | Dungler | 26—57 |
| 3,179,976 | 4/1965 | Nash | 18—1 |
| 3,179,977 | 4/1965 | Nash | 18—1 |
| 3,457,608 | 7/1969 | Gageur | 18—1 |

FOREIGN PATENTS

| 921,737 | 1/1947 | France. |
| 1,028,549 | 2/1953 | France. |
| 112,553 | 1/1918 | Great Britain. |
| 433,700 | 8/1935 | Great Britain. |

ROBERT R. MACKEY, Primary Examiner

U.S. Cl. X.R.

18—1; 26—57